United States Patent
Krohn

[11] 3,910,223
[45] *Oct. 7, 1975

[54] INFLATION AND PRESSURE CHANGE INDICATION DEVICE

[75] Inventor: Henry W. Krohn, Durham, N.C.

[73] Assignee: Eaton Corporation, Cleveland, Ohio

[*] Notice: The portion of the term of this patent subsequent to Apr. 2, 1991, has been disclaimed.

[22] Filed: Nov. 16, 1973

[21] Appl. No.: 416,478

Related U.S. Application Data

[63] Continuation-in-part of Ser. No. 340,502, March 12, 1973, Pat. No. 3,800,736.

[52] U.S. Cl............. 116/70; 73/388 R; 137/624.27; 251/73
[51] Int. Cl.² ....................................... G01L 19/12
[58] Field of Search.............. 116/70; 73/388 R; 137/624.27; 251/73

[56] References Cited
UNITED STATES PATENTS
3,800,736  4/1974  Krohn................................ 116/70

Primary Examiner—James J. Gill
Assistant Examiner—Anthony V. Ciarlante
Attorney, Agent, or Firm—Teagno & Toddy

[57] ABSTRACT

A combination device for inflating and deflating a pressurized container and for indicating variations from a predetermined pressure in the pressurized container. The device includes a first chamber exposed to pressure within the monitored container and a second chamber, or reference chamber, which is selectively pressurized to a predetermined reference pressure. A mechanism sensitive to a predetermined absolute pressure differential between the two chambers will simultaneously indicate the pressure change and will place the two chambers in fluid communication. Upon equalization of pressure between the two chambers, the mechanism may be returned to a position whereat it will cease to indicate and will block fluid communication between the two chambers. The device also includes an independent passageway for fluid communication between atmosphere and the pressurized container which is controlled by a normally closed inflation valve such as a standard tire inflation valve core.

18 Claims, 2 Drawing Figures 3,910,223

INFLATION AND PRESSURE CHANGE INDICATION DEVICE

RELATED APPLICATIONS

This application is a Continuation-In-Part of copending U.S. Ser. No. 340,502, filed Mar. 12, 1973, now U.S. Pat. No. 3,800,736.

BACKGROUND OF THE INVENTION

1. Field of the Invention

This invention relates to inflation valves and pressure change indicators and more particularly, to combination inflation valve and pressure change indicators suitable for inflating or deflating a pneumatic tire and for indicating reduced and/or increased pressure in the pneumatic tire.

2. Description of the Prior Art

The long-realized need for a reliable presure inflation valve and indication device, especially for use with pneumatic tires, is indicated by the great quantity of prior art devices. Many of the prior art devices are complicated, relatively expensive and difficult to assemble structures utilizing a spring or springs as the biasing reference devices. These devices were not totally satisfactory as they were usable to indicate pressure variations from a single given pressure only, namely, that pressure corresponding to the spring constant or required a complicated and rather inaccurate setting by variable depression or extension of the spring. These devices were also subject to mechanical spring failure and usually could only sense a single variation, i.e., either over or under pressure, but not both.

The prior art also includes several devices which utilize a diaphragm between a variable reference pressure chamber and a chamber exposed to the tire or monitored container pressure. One of these devices is seen in U.S. Pat. No. 3,605,679 and requires a separate pressurizing and gauging of both the reference chamber and of the tire. This device is thus not totally satisfactory as it requires two rather complicated and time-consuming operations and also because it is not an inflation valve for the tire. Another type of prior art device is shown in U.S. Pat. No. 2,479,915 and includes a device wherein the reference pressure is set by initial tire pressure. However, this device must be removed and remounted upon the tire valve stem during the pressurization of the tire which is a time-consuming operation and raises the possibility of loss and/or damage to the indicator. The device of U.S. Pat. No. 2,479,915 is also not totally satisfactory as it is a low-pressure indicator only.

SUMMARY OF THE INVENTION

In accordance with the present invention, the drawbacks of the prior art have been overcome to the extent that a relatively simple and inexpensive combination inflation valve and pressure change indicator has been provided which will indicate both increases and decreases in pressure relative to a selectively set reference pressure and is easily and simply set to reference pressure at the same time and in the same operation as the pressurized container is pressurized to its desired pressure.

The above is accomplished by providing a pressure change indication device having a first chamber exposed to pressure within the monitored pressurized container and a second, or reference chamber, which is selectively presusrized to the desired reference pressure. The indicator includes a mechanism which will give visual and/or other indication upon a predetermined pressure differential between the two chambers and will also place the two chambers in fluid communication. Upon equalization of pressure between the two chambers, the mechanism may be easily returned to a position whereat indication is ceased and the first and second chambers are fluidly isolated. The device also includes an independent fluid passage into the pressurized container which is controlled by an inflation valve such as standard tire inflation valve core for selective inflation or deflation of the pressurized container.

The above-mentioned mechanism may include a rod or pin member having a first position whereat only a small portion extends from the indicator housing and whereat it blocks fluid communication between the two chambers and a second position whereat a relatively larger portion of the pin extends beyond the indicator housing for indication purposes and fluid communication between the two chambers is established. The pin may include a bore therethrough which is fitted with an inflation valve for selective inflation and deflation of the pressurized container. The mechanism also includes means for biasing the pin member to the second position, a locking device maintaining the pin in the first position, and a diaphragm-type device which will release the locking mechanism in response to a predetermined pressure differential between the first and second chambers.

It will thus be appreciated that as the pressurized container is pressurized to its desired pressure, a pressure imbalance between the two chambers will cause the two chambers to be placed in fluid communication and thus the reference chamber will be simply and quickly set to desired pressure at the same time and in the same operation as the monitored container is pressurized. Upon reaching the desired pressure, the mechanism is simply set by moving the pin member to its first position and then the indicator of the present invention will indicate pressure differentials as discussed above.

An object of the present invention is to provide a new and improved combination inflation valve and pressure change indicator.

A further object of the present invention is to provide a relatively simple and inexpensive combination inflation valve and pressure change indicator which is quickly and easily set to a selected reference pressure at the same time and in the same operation in which the monitored chamber is pressurized.

Other objects, advantages and features of the present invention will become apparent from the following detailed description of the invention taken in connection with the accompanying drawings.

DESCRIPTION OF THE PREFERRED EMBODIMENT

Figure 1:
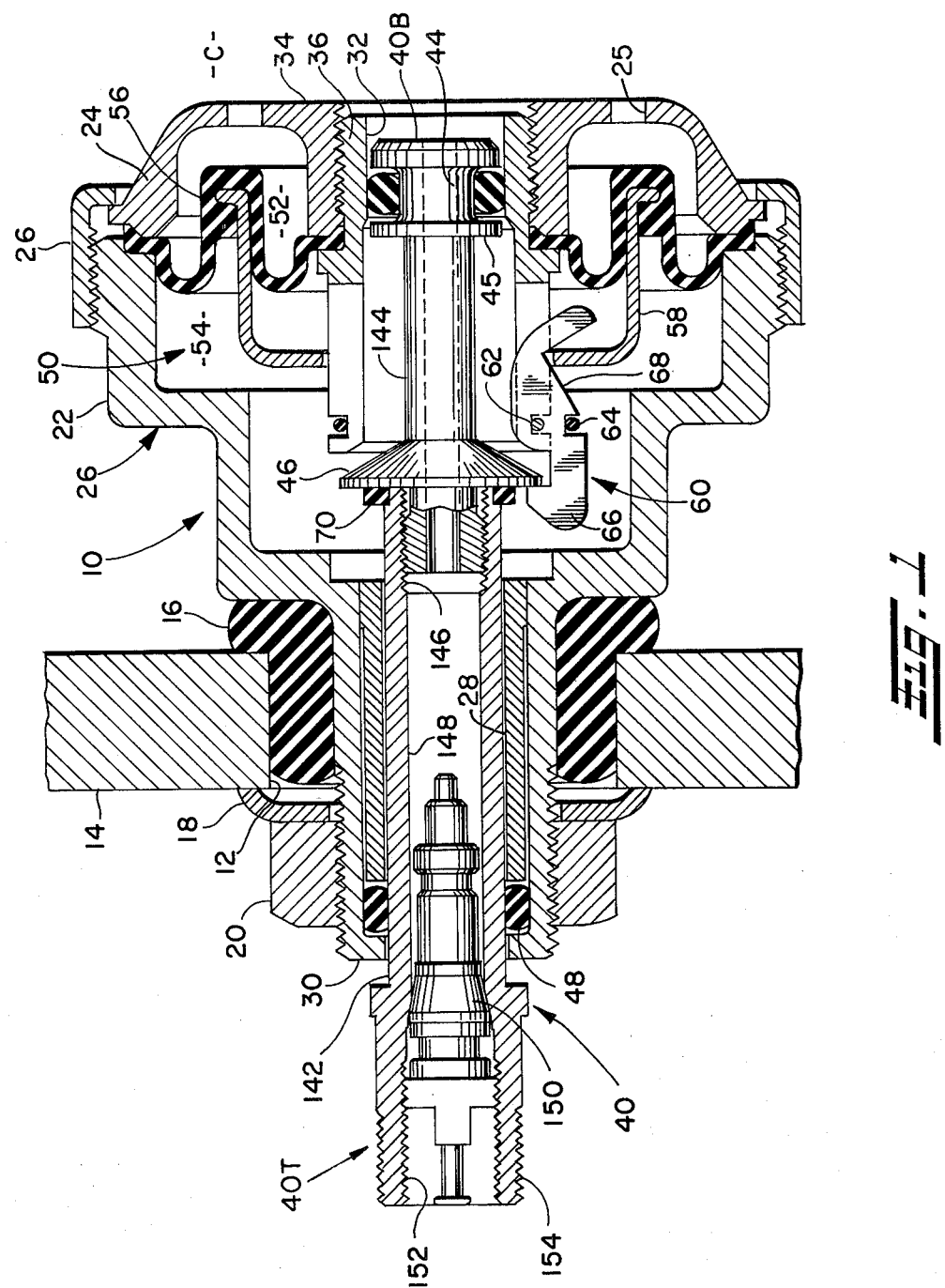
FIG. 1 is a vertical sectional view of the combination inflation valve and pressure change indication device of the present invention in a first operational position.

Referring to the drawings in more detail, the combination inflation valve and pressure change indicator 10 of the present invention may be seen in sectional view by reference to FIG. 1. The indicator 10 is mounted through an aperture 12 in the wall 14 of a pressurized container C such as in the rim of a tubeless tire. The indicator may be mounted in the manner of a snap-in valve stem as is well known in the art or may be sealingly mounted by means of grommet 16, washer 18, and threaded member 20 as is illustrated in FIG. 1.

The inflation valve and indicator 10 includes a housing 21 which comprises an upper section 22 and a lower section 24 which are sealingly connected by means of threaded ring member 26. The upper section of the housing 22 defines an elongated bore 28 opening to the top 30 of the housing 21 which is external to the container C while the lower section 24 will define an elongated bore 32 opening to the bottom 34 of the housing which is internal to the container C. Bores 28 and 32 are substantially concentric and bore 32 may be defined by a separate tubular member 36 which is threadably engaged to the lower housing section 24.

Mounted within the housing 21 is a generally rod-shaped member 40. The rod-shaped member 40 includes an upper or stem portion 42, a lower valving portion 44, and a flanged portion 46 interposed the upper and lower portions. As may be seen, the stem portion 42 is slidably and sealingly engaged in bore 28 by virtue of upper O-ring 48, and in the position shown in FIG. 1, valving portion 44 is slidably and sealingly engaged in bore 32. Valving portion 44 is shown as including an O-ring 45 for sealing engagement with bore 32. While portions 42 and 44 are shown as slidably and sealingly engaging bores 28 and 32 respectively by means of O-rings, it is understood that other slidable and sealing connections are possible such as simple metal-to-metal contact and the like.

Rod-shaped member 40 may be of a two-piece structure comprising an upper portion 142 and a lower portion 144 which are joined as at threads 146. The rod-shaped member 40 includes an axial bore 148 therethrough which defines a fluid passage between the pressurized container C and atmosphere. The bore 148 includes internal threads 152 for receiving a normally closed inflation valve such as the standard tire inflation valve core 150 shown. The outer portion 40T of rod-shaped member 40 may also include external threads 154 to receive a standard valve cap, inflationdeflation tool or the like. Bore 148 and valve core 152 thus comprise an inflation-deflation means for container C which is totally independent of the pressure change indication mechanism.

Housing 21 defines a generally central cavity 50 which is divided into a first and second chamber 52 and 54 respectively by a diaphragm 56. The diaphragm 56 carries an actuating ring 58 thereon. The upper portion of tube-like member 36 carries a latch 60 pivotably mounted thereto as at pin 62. Latch 60 is held in position by means of a resilient ring 64. The latch 60 includes a catch 66 which will engage the flange 46 of the rod-shaped member 40 and prevent the upward movement thereof. The latch 60 also includes a notched V-shaped portion 68 which receives the tip of actuating ring 58 when the diaphragm 56 is in its undeformed position as is shown in FIG. 1. It will be noted that a sufficient upward or downward movement of diaphragm 56 and actuating ring 58 will result in a pivoting of latch 60 and thus the disengagement of flange 46 by latch 66.

First chamber 52 is in fluid communication with the pressurized container C by means of passages 25 in the lower housing portion 24 and is thus at the same pressure as the interior of container C. When the rod member 40 has been placed in the first or locked position as is shown in FIG. 1, the second reference chamber 54 is fluidly isolated from container C and the first chamber 52. The bottom 40B of the rod member 40 is exposed to the interior of pressurized container C while the top 40T of the rod member 40 is exposed to atmosphere and thus the pin member is biased to move upwardly.

Figure 2:
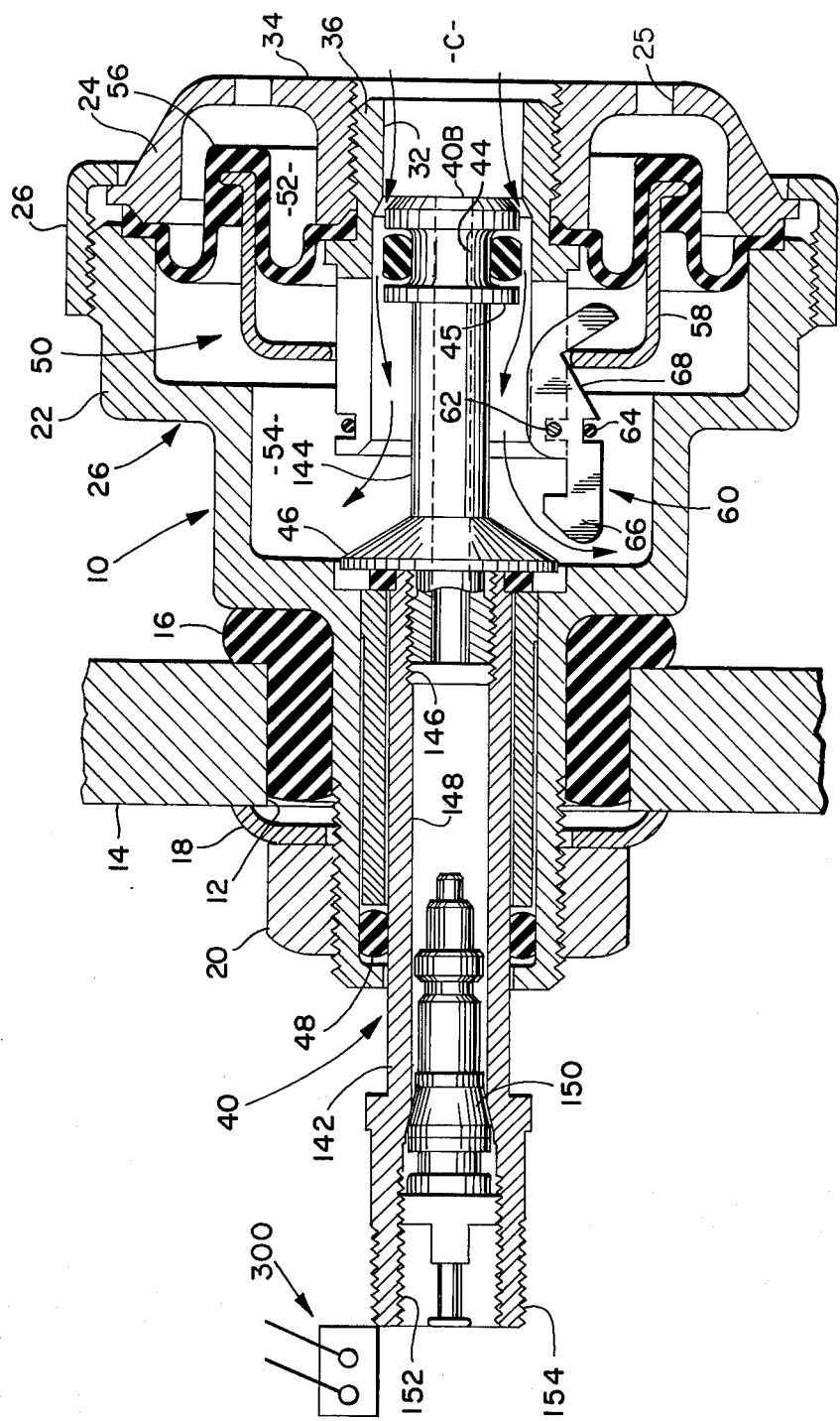
FIG. 2 is a vertical sectional view of the device of FIG. 1 in a second operational position.

A pressure change or pressure differential between the first and second chambers sufficient to result in an upward or downward movement of the diaphragm 56 and the actuating ring 58 will cause the latch 60 to pivotably disengage the flange 46 of the rod member 40 and the rod member 40 will move to its second position as is shown in FIG. 2. In the second position, the top 40T of the rod member 40 will extend considerably beyond the housing and give a visual indication of a pressure change in monitored pressurized container C. The top 40T of the pin member may carry a colored or luminous coating to ease visual indication and/or may actuate an electrical sensing device 300 or the like. As is seen in FIG. 2, in the second position of rod 40, the valving portion 44 disengages bore 32 and allows the second chamber 54 to fluidly communicate with the interior of pressurized container C and thus the first and second chambers are in fluid communication and at the same pressure which allows diaphragm 56 to return to its undeformed position. It is noted that latch 60 is biased to the radially inward or locking position and will thus lockingly reengage the flange portion 46 of rod 40 when the rod is returned to the first position such as by downward pressure applied to the top 40T of the rod.

As an additional feature, the top of flange 46 may carry a sealing washer 70 which will seal the bore 28 from the chamber 54 when the rod member 40 is in the second position. The sealing washer 70 thus acts as a fail-safe seal to prevent the pressurized container C from venting to atmosphere in the event O-ring 48 fails.

In operation, the pressurized container C is pressurized by means of bore 148 and valve core 152 to the desired or reference pressure. At the same time and during the same operation, the pressure differential between chambers 52 and 54 will be sufficient to deflect diaphragm 56 and actuating ring 58 for the pivotal release of flange 46 by the latch 66 and thus the rod 40 will move to its second position allowing chambers 52 and 54 to both communicate with the interior of pressurized container C. When pressurized container C is pressurized to the desired pressure, the first chamber 52 and the second, or reference chamber 54 will all be the same pressure. Then, by simply pushing rod 40 downwardly until it is in its first position, the reference pressure chamber will be quickly, simply, and accurately set at the reference pressure. Once the pressure change indicator has been so set, the indicator will indicate a predetermined change in the interior pressure of monitored pressurized container C as has been discussed above.

In the embodiment shown, chambers 52 and 54 are located within the interior of the pressurized container C. In this particular configuration, the indicator will not indicate pressure changes due to temperature build-up because the pressure changes caused by temperature build-up will be equal within both chambers 52 and 54. If sensitivity to temperature-caused pressure change is required, it is a relatively simple matter to mount the indicator 10 so that the second chamber 54 is substantially exterior of the container C.

It will be apparent from a reading of the above specification that the combination inflation valve and pressure change indicator of the present invention is a relatively inexpensive, simple-to-assemble device which will indicate both increases and decreases in the monitored container pressure and which is easily set to desired pressure at the same time and in the same operation as the monitored container is pressurized. By way of example, if the monitored container is a pneumatic tire, the combination valve and indicator of the present invention will be installed in an aperture of the tire rim, preferably of the same size as apertures presently provided for the snap-in tire valve. The tire will then be pressurized to the desired pressure causing the rod member 40 to move to its second position. When the desired pressure is reached, the rod member 40 is simply and externally returned to its first position and the indicator is then set to indicate variations in tire pressure from the predetermined reference pressure.

Although the present invention has been described in its preferred form with a certain degree of particularity, it is understood that the present description of the preferred form has been made by way of example only and that numerous changes in the details of construction and combination and arrangement of the parts may be resorted to without departing from the scope of the invention as is hereinafter claimed.

I claim:

1. A device for pressurizing a container to be monitored and for indicating variations from reference pressure in the monitored pressurized container, said device comprising:
    a housing defining a first and a second chamber, said first chamber in fluid communication with the interior of said container;
    means mounted to said housing responsive to a predetermined absolute pressure differential between said first and second chamber, said means in a first position corresponding to less than the predetermined pressure differential between the two chambers blocking fluid communication between the two chambers and in a second position corresponding to at least the predetermined pressure differential between the two chambers establishing fluid communication between the two chambers and indicating the existence of a variation from reference pressure in the monitored pressurized container; and
    a fluid passage into said container independent of said means, said fluid passage including a normally closed valve therein.

2. The device of claim 1 wherein the housing is adapted to be sealingly mounted through an aperture in the monitored container, a portion of said means extending relatively further from said housing exterior of said container in said second position then in said first position to indicate the existence of a pressure variation.

3. The device of claim 2 wherein said means responsive to a predetermined absolute pressure differential between the two chambers comprises:
    a rod member slidably and sealingly engaged in said housing, said rod member in the first position sealing a fluid path between the first and second chambers and in the second position extending further from the housing then in said first position and unsealing the fluid path between the chambers;
    means biasing said rod member to the second position;
    means normally locking the rod in the first position; and
    a diaphragm interposed the first and second chambers, said diaphragm effective upon deflection corresponding to the said predetermined pressure differential to move said locking means out of locking engagement with said rod member.

4. The device of claim 3 wherein said fluid passage comprises an axially extending bore through said rod member.

5. The device of claim 4 wherein said normally closed valve comprises a tire inflation valve core mounted in said axially extending bore for controlling fluid flow through said axially extending bore.

6. The device of claim 5 wherein the rod member is exposed at one end to the interior of the pressurized container and at the other end to the exterior of the pressurized container, the means biasing said rod to the second position being the pressure within the pressurized container acting on said one end of the rod member.

7. The device of claim 5 wherein said locking means will lockingly reengage the rod member when said rod member is returned to said first position.

8. The device of claim 7 wherein said second chamber is pressurized to the reference pressure by pressurizing the monitored container through the fluid passage to the reference pressure and then placing said rod member in the first position, fluidly isolating said second chamber in a condition whereat it is pressurized to the reference pressure.

9. The device of claim 8 wherein said housing is mounted in the aperture of said container such that both the first and second chambers are interior of said container to minimize the sensitivity of the device to pressure variations within said container caused by temperature variations.

10. The device of claim 9 wherein said housing is mounted in the aperture of said container with the first chamber substantially interior and the second chamber substantially exterior of said container to render said device sensitive to pressure variations within said container caused by temperature variations.

11. A device for allowing pressurization of a monitored container and for indicating a predetermined, absolute variation from a selectively variable reference pressure in the monitored pressurized container, said device comprising:
    a housing adapted to be sealingly mounted in an aperture in the container, said housing defining a first and a second chamber, said first chamber being in fluid communication with the interior of the container, said housing additionally defining an elongated bore opening to the portion of the housing exterior of the container and a fluid passage between said first and second chambers, said bore and passage being spaced and substantially concentric;
    an elongated rod member having an upper portion slidably and sealingly engaged in said elongated bore, a valve portion for selective sealing of said passage and a flanged portion interposed the upper and valve portions, said rod member having first position corresponding to less than the predetermined absolute pressure variation and a second position corresponding to at least the predetermined absolute pressure variation, in said first position said upper portion being substantially interior of said bore and said sealing portion being in sealing engagement with said passage and in said second position said upper portion having a relatively greater extension from said housing to indicate a pressure variation and said sealing portion disengaging said passage to allow fluid communication between said first and second chambers, said rod member including an axial bore therethrough for fluid communication between said container and the exterior of the device and a normally closed valve for controlling fluid flow through said axial bore;

a locking member pivotably mounted to said housing, said locking member having a flange portion engaging section and a lever arm section, said locking member biased to a position whereat said flanged portion of said rod member will be engaged when said rod is in said first position preventing said rod from moving to said second position;

a diaphragm interposed said first and second chambers, said diaphragm carrying an actuating member which, upon diaphragm movement corresponding to the existence of the predetermined absolute pressure differential between the first and second chambers, will bear against the lever arm section of the locking member causing the locking member to pivotably disengage the flanged portion of the rod;

and means biasing said rod to the second position.

12. The device of claim 11 wherein said normally closed valve comprises a tire inflation valve core located in said axial bore adjacent the upper portion thereof for allowing selective pressurization of said container through said axial bore.

13. The device of claim 12 wherein said upper portion of said rod carries a highly visible coating.

14. The device of claim 12 additionally including an electronic device for sensing the extension of said upper portion of said rod from said housing.

15. The device of claim 12 when said valving portion is exposed to container pressure and said upper portion is exposed to atmosphere pressure when said rod is in the first position, said biasing means comprising container pressure acting upon the valving portion.

16. The device of claim 12 wherein said pressurized container is a pneumatic tire and said aperture is an aperture in the tire rim.

17. The device of claim 12 wherein said elongated bore carries at least one O-ring for sealingly engaging said upper rod portion and said valving portion carries at least one O-ring for sealing and sliding engagement in said passage.

18. The device of claim 12 wherein said second chamber is pressurized to reference pressure by inflating the monitored container to desire pressure through said axial bore and then pushing the upper portion of the rod member inwardly unitl it is engaged by the locking member in the first position.

* * * * *